(12) United States Patent
Shih et al.

(10) Patent No.: US 10,954,346 B2
(45) Date of Patent: Mar. 23, 2021

(54) RESIN AND INK

(71) Applicant: INDUSTRIAL TECHNOLOGY RESEARCH INSTITUTE, Hsinchu (TW)

(72) Inventors: Hsi-Kang Shih, New Taipei (TW); Shinn-Jen Chang, Hsinchu (TW); Chung Huan Hsu, Taipei (TW); Yu Chun Shen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 118 days.

(21) Appl. No.: 16/233,805

(22) Filed: Dec. 27, 2018

(65) Prior Publication Data

US 2020/0207923 A1 Jul. 2, 2020

(51) Int. Cl.
| | |
|---|---|
| *C08G 83/00* | (2006.01) |
| *C09D 11/102* | (2014.01) |
| *C09D 11/101* | (2014.01) |

(52) U.S. Cl.
CPC .......... *C08G 83/003* (2013.01); *C09D 11/101* (2013.01); *C09D 11/102* (2013.01)

(58) Field of Classification Search
CPC .... C08G 83/003; C09D 11/102; C09D 11/101
See application file for complete search history.

(56) References Cited

U.S. PATENT DOCUMENTS

| | | | | |
|---|---|---|---|---|
| 4,638,029 A | * | 1/1987 | Meschke | ............... C08G 85/00 264/12 |
| 4,855,403 A | * | 8/1989 | Meschke | ............... C08G 65/04 528/419 |
| 4,857,218 A | * | 8/1989 | Meschke | ............... C08G 65/04 508/223 |
| 7,091,308 B2 | | 8/2006 | Haggman et al. | |
| 7,521,521 B2 | | 4/2009 | Bruchmann et al. | |
| 7,985,424 B2 | * | 7/2011 | Tomalia | ............... C08G 83/003 424/486 |
| 8,247,467 B2 | | 8/2012 | Mijolovic et al. | |
| 9,193,894 B2 | | 11/2015 | Williamson et al. | |
| 2005/0131205 A1 | * | 6/2005 | Haggman | .......... C08G 65/2609 528/417 |
| 2014/0242353 A1 | * | 8/2014 | Nakano | .................. G03F 7/029 428/195.1 |

FOREIGN PATENT DOCUMENTS

| | | |
|---|---|---|
| CA | 2 902 928 C | 4/2018 |
| CN | 1279089 C | 10/2006 |
| CN | 101717499 A | 6/2010 |
| CN | 101818005 A | 9/2010 |
| CN | 101827577 A | 9/2010 |
| CN | 102367291 B | 1/2014 |
| CN | 103755949 A | 4/2014 |
| CN | 104479126 B | 10/2016 |
| CN | 106046335 A | 10/2016 |
| CN | 104371098 B | 12/2016 |
| CN | 106632992 A | 5/2017 |
| CN | 106967213 A | 7/2017 |
| CN | 104530415 B | 9/2017 |
| CN | 104877127 B | 11/2017 |
| EP | 1 468 040 B1 | 6/2012 |
| JP | 4462934 B2 | 5/2010 |
| TW | I356709 B | 1/2012 |
| TW | I384032 B | 2/2013 |

OTHER PUBLICATIONS

Taiwanese Notice of Allowance and Search Report for Taiwanese Application No. 108100944, dated Feb. 14, 2020.

* cited by examiner

*Primary Examiner* — Jessica M Roswell
(74) *Attorney, Agent, or Firm* — Birch, Stewart, Kolasch & Birch, LLP

(57) ABSTRACT

An ink is provided, which includes a resin, UV curable monomer, and photo initiator. The resin is formed by reacting a plurality of end capping agents with a dendrimer compound in an environment including esterification catalyst, inhibitor, and first solvent. The dendrimer compound is formed by reacting a multi-hydroxy compound and a plurality of hydroxy-containing epoxy compounds in an environment including alkaline catalyst and second solvent. The multi-hydroxy compound and the hydroxy-containing epoxy compounds have a molar ratio of 1:6 to 1:20, and the multi-hydroxy compound and the end capping agents have a molar ratio of 1:6 to 1:20. The end capping agents include acrylic acid, methacrylic acid, glycidyl methacrylate, or 2-amino acrylic acid. The resin and the UV curable monomer have a weight ratio of 100:30 to 100:5000, and the resin and the photo initiator have a weight ratio of 100:30 to 100:500.

9 Claims, No Drawings

RESIN AND INK

TECHNICAL FIELD

The technical field relates to ink, and in particular it relates to resin contained in the ink.

BACKGROUND

Conventional solvent-based inks are gradually replaced with UV curable inks due to the advantages of the UV curable inks, such as environmental safety, energy- and material-efficient, quick customization, and digital automated manufacturing. The UV curable inks are mainly applied as a layer of high hardness and reinforced protection, such as hard plate substrates (e.g. PCB), protective coating for panels, or the like. The coatings formed from conventional UV curable inks lack flexibility, thereby failing to be applicable in flexible substrates such as PET film, PU film, or the like. The 3D printing and inkjet printing require an ink that is fast curing and has a low contraction ratio, which cannot be achieved by the conventional UV curable inks. Accordingly, a novel UV curable ink and coating is called for to meet the above requirements.

SUMMARY

One embodiment of the disclosure provides a resin, formed by reacting a plurality of end capping agents with a dendrimer compound in an environment including esterification catalyst, inhibitor, and first solvent. The dendrimer compound is formed by reacting a multi-hydroxy compound and a plurality of hydroxy-containing epoxy compounds in an environment including alkaline catalyst and second solvent. The multi-hydroxy compound and the hydroxy-containing epoxy compounds have a molar ratio of 1:6 to 1:20, the multi-hydroxy compound and the end capping agents have a molar ratio of 1:6 to 1:20, and the end capping agents include acrylic acid, methacrylic acid, glycidyl methacrylate, or 2-amino acrylic acid.

One embodiment of the disclosure provides an ink, including a resin, UV curable monomer, and photo initiator. The resin is formed by reacting a plurality of end capping agents with a dendrimer compound in an environment including esterification catalyst, inhibitor, and first solvent. The dendrimer compound is formed by reacting a multi-hydroxy compound and a plurality of hydroxy-containing epoxy compounds in an environment including alkaline catalyst and second solvent. The multi-hydroxy compound and the hydroxy-containing epoxy compounds have a molar ratio of 1:6 to 1:20, the multi-hydroxy compound and the end capping agents have a molar ratio of 1:6 to 1:20, and the end capping agents include acrylic acid, methacrylic acid, glycidyl methacrylate, or 2-amino acrylic acid. The resin and the UV curable monomer have a weight ratio of 100:30 to 100:5000, and the resin and the photo initiator have a weight ratio of 100:30 to 100:500.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a resin, being formed by reacting a plurality of end capping agents with a dendrimer compound in an environment including esterification catalyst, inhibitor, and first solvent. The dendrimer compound is formed by reacting a multi-hydroxy compound and a plurality of hydroxy-containing epoxy compounds in an environment including alkaline catalyst and second solvent. For example, the reaction of the multi-hydroxy compound and the hydroxy-containing epoxy compound for forming the dendrimer compound can be shown as the formulae below:

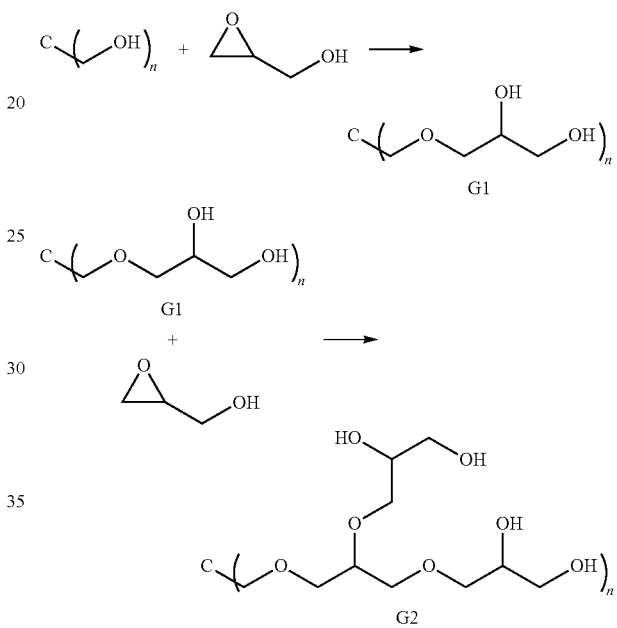

In the above formulae, n can be 3, 4, or more, which is the number of hydroxy groups of the multi-hydroxy compound. The core of the multi-hydroxy compound in the above formulae is quaternary carbon, but the disclosure is not limited thereto. For example, the core of the multi-hydroxy compound can be $C_{2-10}$ alkyl group, $C_{3-10}$ cycloalkyl group, $C_{6-10}$ aromatic group, or $C_{5-10}$ heteroaromatic group. For example, the multi-hydroxy compound can be pentaerythritol, 2-methyl-1,3-propylene glycol, 1,1,1-trimethylolpropane, 1,4-cyclohexanedimethanol, 1,3-butylene glycol, neopentylene glycol, a dimer thereof, a trimer thereof, or a polymer thereof. In one embodiment, the hydroxy-containing epoxy compound is glycidol, but the disclosure is not limited thereto. For example, the hydroxy-containing epoxy compound can be aliphatic epoxy compound, such as glycidol, 3-ethyl-3-oxetanemethanol, 3-alkyl-3-(hydroxyalkoxy)oxetane, 3,3-di(hydroxyalkyl)oxetane, the like, or a combination thereof. In the above Formulae, all the hydroxy groups of the multi-hydroxy compound react with the epoxy groups of the hydroxy-containing epoxy compounds to form generation 1 intermediate G1 through ring-opening reaction. All the hydroxy groups of the intermediate G1 then react with the epoxy groups of the hydroxy-containing epoxy compounds to form generation 2 intermediate G2 through ring-opening reaction. However, it should be understood that part of hydroxy groups of the multi-hydroxy compound and part of hydroxy groups of the intermediate G1 may not react with the epoxy group of the hydroxy-containing epoxy compounds due to steric hindrance. In other words, the number of terminal hydroxy groups of the dendrimer compound is less than or equal to n×2×2. On the other hand, the dendrimer compound is not limited to the generation 2 intermediate G2. The intermediate G2 may further react with the epoxy group of the hydroxy-containing epoxy compound through a ring-opening reaction, thereby forming generation 3 intermediate, generation 4 intermediate, or generation>4 intermediate, and so on.

In the above reaction, the alkaline catalyst functions to nucleophilic active the oxygen atom after dehydrogenating the hydroxy group. The alcohol salt compound may serve as the alkaline catalyst. In one embodiment, the suitable alkaline catalyst for the above reaction can be sodium methoxide, potassium methoxide, potassium tert-butoxide, sodium tert-butoxide, and the like, and the suitable second solvent for the above reaction can be toluene, 1,4-dioxane, or the like. It should be understood that one skilled in the art may utilize other suitable alkaline catalyst and second solvent, which still belong to the field of the disclosure.

The dendrimer compound (e.g. the intermediate molecule G2) may react with a plurality of end capping agents in an environment including esterification catalyst, inhibitor, and first solvent to form a resin. In one embodiment, the end capping agents may include acrylic acid, methacrylic acid, glycidyl methacrylate, 2-amino acrylic acid, or the like. When the end capping agent is acrylic acid, the above reaction can be shown as the formula below:

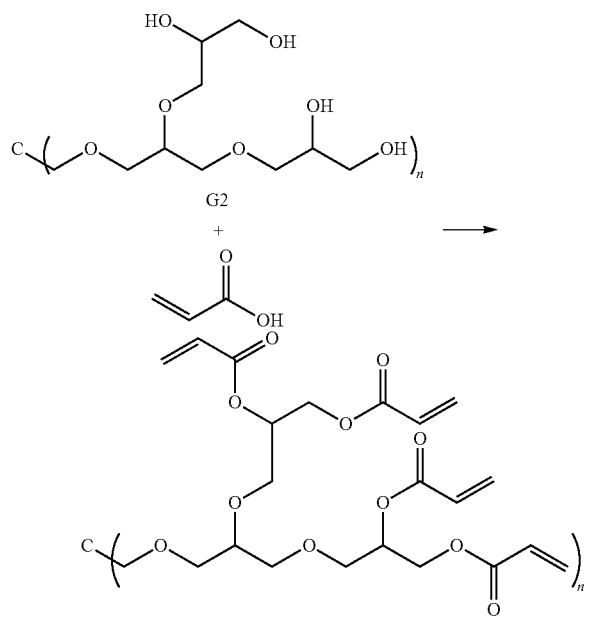

In the above formula, all the terminal hydroxy groups of the dendrimer compound react with the acrylic acid. Alternatively, the end capping agents may further include other end capping agents. For example, part of the terminal hydroxy groups of the dendrimer compound react with the acrylic acid, and the other unreacted terminal hydroxy groups then react with other end capping agents such as $C_{2-6}$ acid (e.g. acetic acid or propionic acid) or anhydride (e.g. maleic anhydride or phthalic anhydride), as shown in the two formulae below.

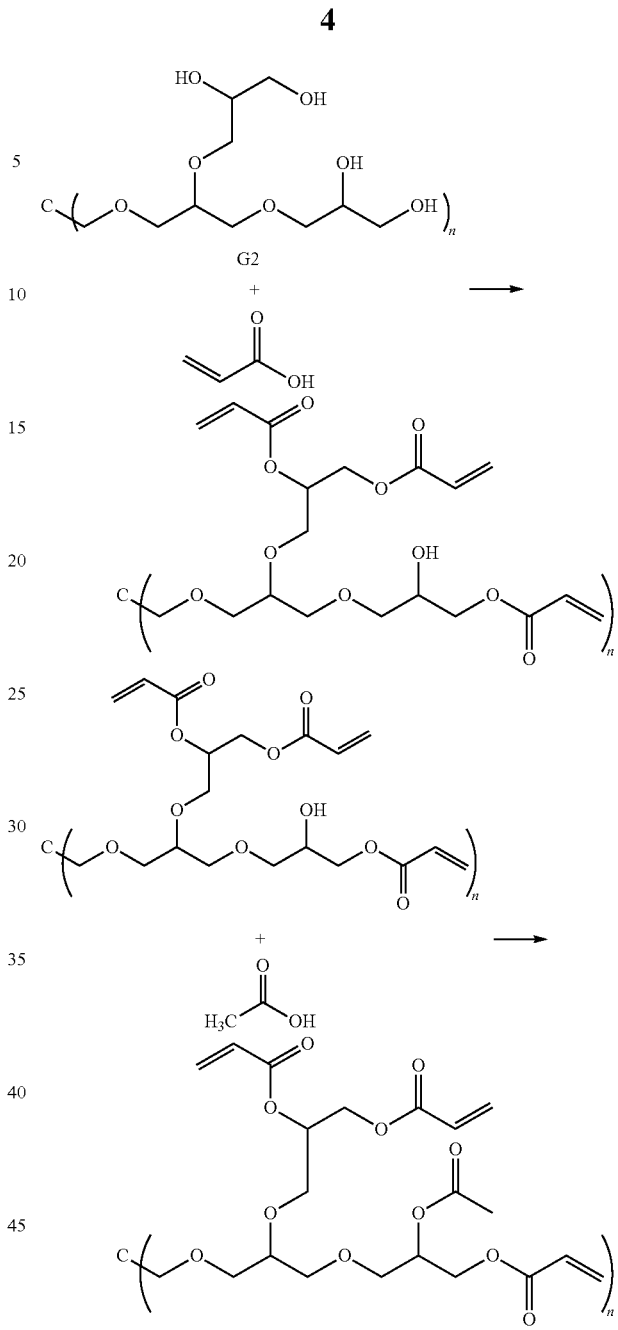

It should be understood that the above formulae are used for illustrative purposes. The number and location of the unreacted hydroxy groups are not limited as shown in the above formulae. The end capping agent may further include $C_{2-6}$ acid (e.g. acetic acid), which is beneficial to prevent the unreacted hydroxy groups (that may degrade the product properties in following application) that remain in the dendrimer compound.

In the above reaction, the esterification catalyst functions as protonating the acrylic acid. The terminal hydroxy groups of the dendrimer compound add to the protonated acrylic acid through nucleophilic addition, and water from the nucleophilic addition can be dehydrated. In other words, the esterification catalyst has dehydration effect. Lewis acid compound may serve as esterification catalyst. The inhibitor may prevent the acrylate groups from crosslinking polymerization during the end capping esterification. For example, 4-methoxyphenol, hydroquinone, 1,4-benzoquinone, phenothiazine, phenyl-β-naphthylamine, p-tert-butylcatechol, and the like may serve as the inhibitor. In one embodiment, the esterification catalyst for the end capping reaction can be methanesulfonic acid, organic phosphoric acid, or the like, the inhibitor can be 4-methoxyphenol, hydroquinone, or the like, and the first solvent can be toluene, cyclohexane, or the like. It should be understood that one skilled in the art may utilize other suitable esterification catalyst, inhibitor, and first solvent, which still belong to the field of the disclosure.

In one embodiment, the multi-hydroxy compound and the hydroxy-containing epoxy compounds have a molar ratio of 1:6 to 1:20. For example, when the multi-hydroxy compound includes three hydroxy groups, the multi-hydroxy compound and the hydroxy-containing epoxy compounds have a molar ratio of 1:6 to 1:15. When the multi-hydroxy compound includes four hydroxy groups, the multi-hydroxy compound and the hydroxy-containing epoxy compounds have a molar ratio of 1:8 to 1:20. If the amount of hydroxy-containing epoxy compound is too low, it cannot provide sufficient branched ether chains. If the amount of hydroxy-containing epoxy compound is too high, the following reaction and processing will be difficult due to too many branched ether chains.

In one embodiment, the multi-hydroxy compound and the end capping agents have a molar ratio of 1:6 to 1:20. If the amount of end capping agent is too low, the hydroxy groups that are not capped will be too many, which results in a higher molecular viscosity that is unfavorable for following application. If the amount of end capping agent is too high, the excess end capping agents cannot react with the terminal hydroxy groups through the end capping esterification. In some embodiments, the resin includes 6 to 16 acrylate terminal groups. If the number of acrylate terminal groups is too low, the crosslinkable groups of each of the resin molecules will be too less, and the resin will have a poor reactivity in following application (e.g. ink).

One embodiment of the disclosure provides an ink including the described resin, UV curable monomer, and photo initiator. For example, the UV curable monomer can be 1,6-hexanediol diacrylate, isobornyl acrylate, trimethylolpropane trimethacrylate, or the like. In one embodiment, the resin and the UV curable monomer have a weight ratio of 100:30 to 100:5000. If the amount of the UV curable monomer is too low, the ink will have an overly high viscosity, a poor compatibility with photo initiator, and a poor processability. If the amount of the UV curable monomer is too high, the photo cured ink will have poor physical properties and cannot be applied. In one embodiment, the photo initiator can be (2,4,6-trimethylbenzoyl)diphenyl phosphine oxide, phenyl-di(2,4,6-trimethylbenzoyl)diphenyl phosphine oxide, or 2-hydroxy-2-methyl-1-phenyl-1-propanone. In one embodiment, the resin and the photo initiator have a weight ratio of 100:30 to 100:500. If the amount of the photo initiator is too low, the curing effect will be incomplete and cannot be used. If the amount of the photo initiator is too high, the ink stability will be easily poor, and the cured ink will be overly brittle and easily cracked.

In some embodiments, the ink further includes an additive, and the resin and the additive have a weight ratio of 100:20 to 100:200. For example, the additive can be adhesion promoter, leveling agent, inhibitor, surfactant, filler, pigment, or a combination thereof. The adhesion promoter may improve the adhesion between the ink and the substrate. The leveling agent may help the thickness of the coating be uniform. The inhibitor may provide the storage stability for the ink. The surfactant may uniformly disperse the compositions in the ink. The filler may increase the mechanical strength of the film formed from the ink. The pigment may change the appearance color of the film formed from the ink. If the additive amount is too much, the physical properties of the cured ink will be poor.

The ink can be coated on a flexible substrate such as plastic, paper, or leather, and then exposed to light to be cured. The cured ink has flexibility. The ink can be coated by spin-on coating, dipping coating, roller coating, spray coating, or another suitable method.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1

10.2 g of pentaerythritol (0.075 mole) was dissolved in 250.0 mL of 1,4-dioxane. 88 mL of potassium methoxide (25% methanol solution, 0.3 mole) was then added to the pentaerythritol solution, and then evenly stirred at room temperature under nitrogen for 0.5 hours. The solution was then heated to 75° C. to 80° C., and 59. 9 mL of glycidol (0.9 mole) was then added to the solution. The solution was then evenly stirred for 12 hours, and then stood to be separated to two layers. The upper layer (clear solvent layer) was removed, and the bottom layer was added to 50 mL of methanol and cationic exchange resin to be neutralized. The cationic exchange resin was then filtered out to obtain a crude, which was condensed under reduced pressure to remove solvent thereof, thereby obtaining 69.25 g of resin D4KLG2 (yield=90%). As proven by mass spectrometer and titration, one molecule of the resin D4KLG2 having 16 terminal hydroxy groups was formed by reacting one pentaerythritol with 12 glycidol (G1=4, G2=8). As shown in GPC measurement, the resin D4KLG2 had a weight average molecular weight of 802 to 1320. As shown in titration result, the resin D4KLG2 had a hydroxy value of 870 to 922 mg KOH/g.

Preparation Example 2

10.0 g of the resin D4KLG2 (9.76 mmole) prepared by Preparation Example 1 was dissolved in 20.0 mL of toluene. 4.22 g of acrylic acid (58.56 mmole), 1.41 g of methanesulfonic acid (14.64 mmole), and 0.182 g of 4-methoxyphenol (1.46 mmole) were then added to the resin solution. A Dean-Stark device was set for dehydration reaction. The reactants were evenly stirred, and air was continuously introduced into the reactants. The reactants were heated to 85° C. to 90° C. The reaction was performed for about 1.5 hours, and 7.03 g of anhydrous acetic acid (117.07 mmole) was further added to the reaction and then reacted for 1.5 hours. The reaction result was cooled to about 40° C. and then condensed under reduced pressure to remove toluene, thereby obtaining crude. The crude was extracted by 50 mL of ethyl acetate and 50 mL of pure water three times, and an organic layer of the extraction was collected. The organic layer was condensed under reduced pressure to remove solvent thereof, thereby obtaining 10.9 g of resin D4KLG2-6AA. As shown in NMR measurement, one molecule of the resin D4KLG2-6AA included 5 to 7 terminal acrylate groups and 9 to 11 acetate groups. The terminal groups of the resin D4KLG2-6AA were acrylate and acetate. As shown in GPC measurement, the resin D4KLG2-6AA had a weight average molecular weight of 1856.16 and poly dispersity index (PDI, Mw/Mn) of 2.16. As shown in viscometer (Brookfield DV2T) measurement, the resin D4KLG2-6AA had a viscosity of 106 cps at 25° C.

Preparation Example 3

10.0 g of the resin D4KLG2 (9.76 mmole) prepared by Preparation Example 1 was dissolved in 20.0 mL of toluene. 11.25 g of acrylic acid (156.08 mmole), 1.52 g of methanesulfonic acid (15.76 mmole), and 0.182 g of 4-methoxyphenol (1.46 mmole) were then added to the resin solution. A Dean-Stark device was set for dehydration reaction. The reactants were evenly stirred, and air was continuously introduced into the reactants. The reactants were heated to 85° C. to 90° C. The reaction was performed for about 3 hours. The reaction result was cooled to room temperature, and then condensed under reduced pressure to remove toluene, thereby obtaining crude. The crude was extracted by 50 mL of ethyl acetate and 50 mL of pure water three times, and an organic layer of the extraction was collected. The organic layer was condensed under reduced pressure to remove solvent thereof, thereby obtaining 12.1 g of resin D4KLG2-16AA. As shown in NMR measurement, one molecule of the resin D4KLG2-16AA included 12 to 16 terminal acrylate groups. As shown in GPC measurement, the resin D4KLG2-16AA had a weight average molecular weight of 2340.76 and PDI of 2.37. As shown in viscometer (Brookfield DV2T) measurement, the resin D4KLG2-16AA had a viscosity of 862 cps at 25° C.

Example 1-1

60.69 parts by weight of UV curable monomer, 20.80 parts by weight of the resin D4KLG2-16AA prepared by Preparation Example 3, 8.37 parts by weight of adhesion promoter, 10.13 parts by weight of photo initiator, and 0.01 parts by weight of inhibitor were mixed to form an ink. The ink had a viscosity of 16.3cps at 45° C. (measured by the viscometer Brookfield DV2T) and a surface tension of 25 mN/m (measured by interfacial tensiometer KRUSS). The described ink was coated by a coating rod (No. F060FKB9) to form a wet film with a thickness of 20.57 μm. The wet film was exposed to UV of 74 mJ/cm$^2$ to be cured. The adhesion of the cured film could achieve 5B class (tested by the standard ASTM-D3359). The flexural resistance of the cured film was measured by the standard ASTM-D2813. The cured film could be bent 40100 times without deformation.

Example 1-2

60.69 parts by weight of UV curable monomer, 20.80 parts by weight of the resin D4KLG2-6AA prepared by Preparation Example 2, 8.37 parts by weight of adhesion promoter, 10.13 parts by weight of photo initiator, and 0.01 parts by weight of inhibitor were mixed to form an ink. The ink had a viscosity of 11.3 cps at 45° C. (measured by the viscometer Brookfield DV2T) and a surface tension of 26 mN/m (measured by interfacial tensiometer KRUSS). The described ink was coated by a coating rod (No. F060FKB9) to form a wet film with a thickness of 20.57 μm. The wet film was exposed to UV of 74 mJ/cm$^2$ to be cured. The adhesion of the cured film could achieve 5B class (tested by the standard ASTM-D3359). The flexural resistance of the cured film was measured by the standard ASTM-D2813. The cured film could be bent 60100 times without deformation.

Comparative Example 1-1

60.69 parts by weight of UV curable monomer, 20.80 parts by weight of the dendrimer polyester resin 6362-100 (commercially available from Eternal Materials, having 12 to 15 terminal acrylate groups), 8.37 parts by weight of adhesion promoter, 10.13 parts by weight of photo initiator, and 0.01 parts by weight of inhibitor were mixed to form an ink. The ink had a viscosity of 13.4 cps at 45° C. (measured by the viscometer Brookfield DV2T) and a surface tension of 27 mN/m (measured by interfacial tensiometer KRUSS). The described ink was coated by a coating rod (No. F060FKB9) to form a wet film with a thickness of 20.57 μm. The wet film was exposed to UV of 74 mJ/cm$^2$ to be cured. The adhesion of the cured film could achieve 5B class (tested by the standard ASTM-D3359). The flexural resistance of the cured film was measured by the standard ASTM-D2813. The cured film could be bent 10100 times without deformation, but could not be bend 30100 times. Compared to the dendrimer polyether resin D4KLG2-16AA with a similar number of terminal acrylate groups in Example 1-1, the cured film formed from the ink containing the dendrimer polyester resin 6362-100 could not be bent so many times without deformation.

Comparative Example 1-2

60.69 parts by weight of UV curable monomer, 20.80 parts by weight of the dendrimer polyester resin 6361-100 (commercially available from Eternal Materials, having 8 terminal acrylate groups), 8.37 parts by weight of adhesion promoter, 10.13 parts by weight of photo initiator, and 0.01 parts by weight of inhibitor were mixed to form an ink. The ink had a viscosity of 13.4 cps at 45° C. (measured by the viscometer Brookfield DV2T) and a surface tension of 28 mN/m (measured by interfacial tensiometer KRUSS). The described ink was coated by a coating rod (No. F060FKB9) to form a wet film with a thickness of 20.57 μm. The wet film was exposed to UV of 74 mJ/cm$^2$ to be cured. The adhesion of the cured film could achieve 5B class (tested by the standard ASTM-D3359). The flexural resistance of the cured film was measured by the standard ASTM-D2813. The cured film could be bent 40100 times without deformation, but could not be bend 50100 tunes. Compared to the dendrimer polyether resin D4KLG2-6AA with a similar number of terminal acrylate groups in Example 1-2, the cured film formed from the ink containing the dendrimer polyester resin 6361-100 could not be bent so many times without deformation.

Comparative Example 1-3

60.69 parts by weight of UV curable monomer, 20.80 parts by weight of the dendrimer polyester resin CN2302 (commercially available from Sartomer, having 16 terminal acrylate groups), 8.37 parts by weight of adhesion promoter, 10.13 parts by weight of photo initiator, and 0.01 parts by weight of inhibitor were mixed to form an ink. The ink had a viscosity of 13.8 cps at 45° C. (measured by the viscometer Brookfield DV2T) and a surface tension of 27 mN/m (measured by interfacial tensiometer KRUSS). The described ink was coated by a coating rod (No. F060FKB9) to form a wet film with a thickness of 20.57 μm. The wet film was exposed to UV of 74 mJ/cm$^2$ to be cured. The adhesion of the cured film could achieve 5B class (tested by the standard ASTM-D3359). The flexural resistance of the cured film was measured by the standard ASTM-D2813. The cured film could not be bent 10100 times without deformation. Compared to the dendrimer polyether resin D4KLG2-16AA with a similar number of terminal acrylate groups in Example 1-1, the cured film formed from the ink containing the dendrimer polyester resin CN2302 could not be bent so many times without deformation.

Example 2-1

28.75 parts by weight of resin, 24 parts by weight of UV curable monomer, 1.5 parts by weight of the resin D4KLG2-16AA prepared by Preparation Example 3, 4.75 parts by weight of adhesion promoter, 6 parts by weight of photo initiator, and 0.03 parts by weight of inhibitor were mixed to form varnish. The varnish and white paste were formulated to form a white ink containing 35% white paste. The white ink had a viscosity of 3748 cps at 25° C. (measured by the viscometer Brookfield DV2T). The ink was spray coated to form a film, and then exposed to UV of 500 mJ/cm² to be cured as a dry film with a thickness of 8 μm to 9 μm. The adhesion of the dry film could achieve 5B class (tested by the standard ASTM-D3359). The dry film had a bright appearance. The pencil hardness of the surface of the dry film was 1H (measured by the standard ASTM-D3363). The T-bend property of the dry film was 1T (measured by the standard ASTM D4145).

Example 2-2

28.75 parts by weight of resin, 24 parts by weight of UV curable monomer, 1.5 parts by weight of the resin D4KLG2-6AA prepared by Preparation Example 2, 4.75 parts by weight of adhesion promoter, 6 parts by weight of photo initiator, and 0.03 parts by weight of inhibitor were mixed to form varnish. The varnish and white paste were formulated to form a white ink containing 35% white paste. The white ink had a viscosity of 3698 cps at 25° C. (measured by the viscometer Brookfield DV2T). The ink was spray coated to form a film, and then exposed to UV of 500 mJ/cm² to be cured as a dry film with a thickness of 8 μm to 9 μm. The adhesion of the dry film could achieve 5B class (tested by the standard ASTM-D3359). The dry film had a bright appearance. The pencil hardness of the surface of the dry film was 1H (measured by the standard ASTM-D3363). The T-bend property of the dry film was 0T (measured by the standard ASTM D4145).

Comparative Example 2-1

28.75 parts by weight of resin, 24 parts by weight of UV curable monomer, 1.5 parts by weight of the resin 6362-100 (commercially available from Eternal Materials, having 12 to 15 terminal acrylate groups), 4.75 parts by weight of adhesion promoter, 6 parts by weight of photo initiator, and 0.03 parts by weight of inhibitor were mixed to form varnish. The varnish and white paste were formulated to form a white ink containing 35% white paste. The white ink had a viscosity of 3675 cps at 25° C. (measured by the viscometer Brookfield DV2T). The ink was spray coated to form a film, and then exposed to UV of 500 mJ/cm² to be cured as a dry film with a thickness of 8 μm to 9 μm. The adhesion of the dry film could achieve 5B class (tested by the standard ASTM-D3359). The dry film had a bright appearance. The pencil hardness of the surface of the dry film was 1H (measured by the standard ASTM-D3363). The T-bend property of the dry film was 2T (measured by the standard ASTM D4145). Compared to the dendrimer polyether resin D4KLG2-16AA with a similar number of terminal acrylate groups in Example 2-1, the dry film formed from the white ink containing the dendrimer polyester resin 6362-100 had a worse T-bend property.

Comparative Example 2-2

28.75 parts by weight of resin, 24 parts by weight of UV curable monomer, 1.5 parts by weight of the resin 6361-100 (commercially available from Eternal Materials, having 8 terminal acrylate groups), 4.75 parts by weight of adhesion promoter, 6 parts by weight of photo initiator, and 0.03 parts by weight of inhibitor were mixed to form varnish. The varnish and white paste were formulated to form a white ink containing 35% white paste. The white ink had a viscosity of 3675 cps at 25° C. (measured by the viscometer Brookfield DV2T). The ink was spray coated to form a film, and then exposed to UV of 500 mJ/cm² to be cured as a dry film with a thickness of 8 μm to 9 μm. The adhesion of the dry film could achieve 5B class (tested by the standard ASTM-D3359). The dry film had a bright appearance. The pencil hardness of the surface of the dry film was 1H (measured by the standard ASTM-D3363). The T-bend property of the dry film was 1T (measured by the standard ASTM D4145). Compared to the dendrimer polyether resin D4KLG2-6AA with a similar number of terminal acrylate groups in Example 2-2, the dry film formed from the white ink containing the dendrimer polyester resin 6361-100 had a worse T-bend property.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A resin, being:
   formed by reacting a plurality of end capping agents with a dendrimer compound in an environment including esterification catalyst, inhibitor, and first solvent, and the dendrimer compound is formed by reacting reactants consisting of a multi-hydroxy compound and a plurality of hydroxy-containing epoxy compounds in an environment including alkaline catalyst and second solvent,
   wherein the multi-hydroxy compound and the hydroxy-containing epoxy compounds have a molar ratio of 1:6 to 1:20, the dendrimer compound and the end capping agents have a molar ratio of 1:6 to 1:20, and the end capping agents are selected from the group consisting of acrylic acid, methacrylic acid, glycidyl methacrylate, 2-amino acrylic acid, $C_{2-6}$ acid, and mixtures thereof,
   wherein the multi-hydroxy compound is selected from the group consisting of pentaerythritol, 2-methyl-1,3-propylene glycol, 1,1,1-trimethylolpropane, 1,4-cyclohexanedimethanol, 1,3-butylene glycol, neopentylene glycol, a dimer thereof, a trimer thereof, a homopolymer thereof, and mixtures thereof.

2. The resin as claimed in claim 1, wherein the multi-hydroxy compound includes three hydroxy groups, and the multi-hydroxy compound and the hydroxy-containing epoxy compounds have a molar ratio of 1:6 to 1:15.

3. The resin as claimed in claim 1, wherein the multi-hydroxy compound includes four hydroxy groups, and the multi-hydroxy compound and the hydroxy-containing epoxy compounds have a molar ratio of 1:8 to 1:20.

4. The resin as claimed in claim 1, wherein the hydroxy-containing epoxy compounds are aliphatic epoxy compound.

5. The resin as claimed in claim 1, wherein the hydroxy-containing epoxy compounds comprises glycidol, 3-ethyl-3-oxetanemethanol, 3-alkyl-3-(hydroxyalkoxy)oxetane, 3,3-di(hydroxyalkyl)oxetane, or a combination thereof.

6. The resin as claimed in claim 1, including 6 to 16 acrylate terminal groups.

7. An ink, comprising:
a resin;
UV curable monomer; and
photo initiator,
wherein the resin is formed by reacting a plurality of end capping agents with a dendrimer compound in an environment including esterification catalyst, inhibitor, and first solvent, and the dendrimer compound is formed by reacting reactants consisting of a multi-hydroxy compound and a plurality of hydroxy-containing epoxy compounds in an environment including alkaline catalyst and second solvent,
wherein the multi-hydroxy compound and the hydroxy-containing epoxy compounds have a molar ratio of 1:6 to 1:20, the dendrimer compound and the end capping agents have a molar ratio of 1:6 to 1:20, and the end capping agents are selected from the group consisting of acrylic acid, methacrylic acid, glycidyl methacrylate, 2-amino acrylic acid, C2-6 acid, and mixtures thereof,
wherein the resin and the UV curable monomer have a weight ratio of 100:30 to 100:5000, and the resin and the photo initiator have a weight ratio of 100:30 to 100:500,
wherein the multi-hydroxy compound is selected from the group consisting of pentaerythritol, 2-methyl-1,3-propylene glycol, 1,1,1-trimethylolpropane, 1,4-cyclohexanedimethanol, 1,3-butylene glycol, neopentylene glycol, a dimer thereof, a trimer thereof, a homopolymer thereof, and mixtures thereof.

8. The ink as claimed in claim 7, further comprising an additive, and the resin and the additive have a weight ratio of 100:20 to 100:200.

9. The resin as claimed in claim 1, wherein the multi-hydroxy compound is pentaerythritol.

* * * * *